(12) United States Patent
Chang et al.

(10) Patent No.: US 7,746,941 B2
(45) Date of Patent: Jun. 29, 2010

(54) SYNCHRONIZATION APPARATUS AND METHOD FOR IMPROVING TIMING ESTIMATION PERFORMANCE IN OFDM-FDMA/CDMA/TDMA SYSTEM

(75) Inventors: Kyung Hi Chang, Seoul (KR); Jeong Ho Roh, Incheon (KR); Tae Hyoung Sun, Gwangju (KR)

(73) Assignee: Inha-Industry Partnership Institute, Incheon (KR)

( * ) Notice: Subject to any disclaimer, the term of this patent is extended or adjusted under 35 U.S.C. 154(b) by 846 days.

(21) Appl. No.: 11/585,233

(22) Filed: Oct. 24, 2006

(65) Prior Publication Data

US 2007/0195914 A1    Aug. 23, 2007

(30) Foreign Application Priority Data

Feb. 23, 2006    (KR) .................... 10-2006-0017870

(51) Int. Cl.
*H04K 1/10* (2006.01)
*H04L 27/28* (2006.01)
*H04L 7/00* (2006.01)

(52) U.S. Cl. ............... 375/260; 375/343; 375/354
(58) Field of Classification Search ............... 375/260, 375/343, 354, 365, 366; 370/480, 503, 509, 370/512, 513, 514
See application file for complete search history.

(56) References Cited

U.S. PATENT DOCUMENTS

| | | | |
|---|---|---|---|
| 6,785,350 B1 * | 8/2004 | Poulbere et al. ............. | 375/343 |
| 7,058,151 B1 * | 6/2006 | Kim ............................. | 375/343 |
| 2004/0141570 A1 * | 7/2004 | Yamazaki et al. ........... | 375/340 |
| 2006/0114812 A1 * | 6/2006 | Kim et al. .................... | 370/206 |
| 2006/0222095 A1 * | 10/2006 | Niu et al. ..................... | 375/260 |

* cited by examiner

*Primary Examiner*—Betsy L Deppe
(74) *Attorney, Agent, or Firm*—Morgan Lewis & Bockius LLP

(57) ABSTRACT

Provided are a synchronization apparatus and method for improving timing estimation performance in an OFDM-FDMA/CDMA/TDMA system, which can correctly estimate symbol timing through a more correct timing metric using a guard interval of a preamble. The synchronization apparatus includes an auto-correlator for calculating an auto-correlation value of a received signal and a signal delayed by a predetermined time, a power detector for calculating power of the received signal, a timing metric/normalizer for normalizing the auto-correlation value by dividing the auto-correlation value by the calculated power to obtain a timing metric, and a peak detector for finding a peak value of the timing metric to estimate a frame starting position and an initial symbol timing. The auto-correlator calculates an auto-correlation length as long as a length of a guard interval, considering the preamble characteristic that the patterns are repeated in the time domain. The initial symbol timing is set to a position determined by adding the position where the timing metric has a peak value to the length of the guard interval and subtracting the maximum value of the expected channel delay spread from the result value.

6 Claims, 5 Drawing Sheets

US 7,746,941 B2

SYNCHRONIZATION APPARATUS AND METHOD FOR IMPROVING TIMING ESTIMATION PERFORMANCE IN OFDM-FDMA/CDMA/TDMA SYSTEM

CROSS-REFERENCE TO RELATED APPLICATIONS

BACKGROUND OF THE INVENTION

1. Field of the Invention

The present invention relates to a synchronization apparatus and method for an OFDM-FDMA/CDMA/TDMA system, and more particularly, to a synchronization apparatus and method for improving timing estimation performance in an OFDM-FDMA/CDMA/TDMA system, which can correctly estimate symbol timing through a more correct timing metric using a guard interval of a preamble.

2. Description of the Related Art

Research on the $4^{th}$ Generation (4G) communication system (which is the next-generation communication system) has been conducted to provide users with services having various Qualities-of-Service (QoSs) at a data rate of about 100 Mbps.

The current $3^{rd}$ Generation (3G) communication system generally supports a data rate of about 384 Kbps in an outdoor channel environment with a relatively poor channel environment, and supports a data rate of up to 2 Mbps even in an indoor channel environment with a relatively good channel environment.

Meanwhile, a wireless local area network (WLAN) system and a wireless metropolitan area network (WMAN) system generally support a data rate of 20-50 Mbps.

Accordingly, research is being conducted on a new communication system that can support high-speed services, which the 4G communication system is intended to provide, by guaranteeing the mobility and QoS in the WLAN system and the WMAN system having a relatively high data rate.

As an approach to achieving these purposes, Orthogonal Frequency Division Multiplexing (OFDM) scheme and Orthogonal Frequency Division Multiple Access (OFDMA) scheme are taken into consideration.

The OFDM is a kind of multicarrier modulation scheme and exhibits excellent performance in multi-path and mobile environments. Because of these advantages, the OFDM is regarded as a modulation scheme suitable for terrestrial digital TV and digital sound broadcasting.

An existing Institute of Electrical and Electronics Engineers (IEEE) 802.11 WLAN uses Direct Sequence Spread Spectrum (DSSS) and Frequency Hopping Spread Spectrum (FHSS) to support a data rate of 2 Mbps at 2.4 GHz ISM (Industrial, Scientific, and Medical) bands.

This standard, however, could not meet the requirement of a highly increasing data rate. Therefore, IEEE 802.11a and IEEE 802.11b was approved as a new physical layer standard in 1999.

IEEE 802.11b supports a date rate of 11 Mbps at 2.4 GHz bands by using a complementary Code Keying (CCK) scheme, an extended version of DSSS. IEEE 802.11b is commercialized and is wide spread.

Meanwhile, IEEE 802.11a adopted OFDM modulation scheme at Unlicensed National Information Infrastructure (U-NII) band of 5 GHz in order to overcome the limitation of the DSSS scheme and obtain a higher data rate.

A convolutional encoder having a coding rate of 1/2, 2/3 and 3/4 is used for offset correction, and a 1/2 Viterbi decoder is used for decoding a convolutional code. Binary Phase Shift Keying (BPSK), Quadrature Phase Shift Keying (QPSK), 16-Quadrature Amplitude Modulation (16-QAM), and 64-QAM are used for subcarrier modulation.

Such an OFDM system must consider frequency offset and symbol synchronization in order to correctly demodulate received signals. If a correct starting point of symbol is not found, inter-symbol interference (ISI) occurs. Consequently, the received signals cannot be correctly recovered.

Generally, the starting point of the symbol is found using correlation values between received signal sequences. The correlation values are obtained using a specific preamble sequence.

The preamble is a single used for synchronizing a transfer timing between two or more systems in a network communication. A proper timing makes it possible for all systems to correctly analyze the start of data transfer.

The preamble includes a short preamble for coarse frequency synchronization and a long preamble for fine frequency synchronization, which are connected each other.

FIG. 1 illustrates a preamble structure of an 802.16a/d/e system and WiBro system.

A downlink preamble of an OFDMA-based portable Internet system is used for initial time synchronization, frequency offset estimation, and cell search. After inverse Fourier transform (IFFT) processing, the downlink preamble has harmonics repeated three times in time domain.

A specific pseudorandom noise (PN) code is BPSK-modulated and then transmitted and subcarriers constructing the preamble are repeated by Np ($Np=N_{FFT}/3$ where $N_{FFT}$ is an FFT size) in time domain.

FIG. 2 is a graph illustrating a timing metric of a conventional symbol timing estimation algorithm. The timing metric has a flat period as much as a guard interval.

A frame starting point and an initial symbol timing are acquired at a position where the timing metric has a peak value. In the ideal case in which no influence of channel or interference signal exists, the frame starting point and the initial symbol timing are acquired within the guard interval. However, there is a great probability that a wrong frame timing is acquired out of the guard interval due to the uncertainty at a boundary portion of the timing metric.

FIG. 3 illustrates a constellation diagram of a traffic channel using the conventional symbol timing estimation algorithm.

Even though the symbol timing is acquired within the guard interval by using a conventional symbol timing estimation algorithm, the accuracy of the estimated timing is reduced.

The timing estimation error appears in a form of phase rotation. Because the timing estimation error is compensated through a channel estimator, it is negligible. However, when the timing estimation error is large, the channel estimator cannot correct the entire error. Thus, the result is given like the constellation diagram of FIG. 3 and the signal-to-noise ratio (SNR) of the received signal is degraded.

SUMMARY OF THE INVENTION

An advantage of the present invention is that it provides a synchronization apparatus and method for improving timing estimation performance in an OFDM-FDMA/CDMA/TDMA system, which can correctly estimate symbol timing. Specifically, a timing metric generating a peak at a correct symbol timing position is obtained using a preamble structure in which patterns are repeated by a predetermined number of times after IFFT process, thereby acquiring a correct timing position.

Additional aspect and advantages of the present general inventive concept will be set forth in part in the description which follows and, in part, will be obvious from the description, or may be learned by practice of the general inventive concept.

According to an aspect of the invention, there is provided a synchronization apparatus for symbol timing synchronization of an OFDM-FDMA/CDMA/TDMA system having a preamble structure in which patterns are repeated three times in time domain. The synchronization apparatus includes: an auto-correlator for calculating an auto-correlation value of a received signal and a signal delayed by $N_p$ ($N_p=N_{FFT}/3$ where $N_{FFT}$ is an FFT size); a power detector for calculating a power of the received signal in order to normalize the auto-correlation value; a timing metric/normalizer for normalizing the auto-correlation value by diving the auto-correlation value by the calculated power to obtain a timing metric; and a peak detector for finding a peak value of the timing metric by measuring one frame while moving by one sample from an arbitrary starting point and estimating a frame starting position and an initial symbol timing.

The auto-correlator calculates an auto-correlation length using $(2N_p-1)+N_{cp}$ ($N_p$: $N_{FFT}/3$, $N_{cp}$: length of a guard interval), considering the preamble characteristic that the patterns are repeated in the time domain.

The auto-correlator calculates the auto-correlation value using a following equation $$P(d) = \sum_{m=0}^{(2N_p-1)+N_{cp}} r(d+m)r^*(d+m+N_p)$$

where r(d) denotes the received signal, d denotes a sample index of the received signal, and m denotes a correlation length index (0–(2Np–1)+Ncp).

The initial symbol timing is set to a position determined by adding the position where the timing metric has a peak value to the length of the guard interval and subtracting the maximum value of the expected channel delay spread from the result value.

According to another aspect of the present invention, there is provided a synchronization method for symbol timing synchronization of an OFDM-FDMA/CDMA/TDMA system having a preamble structure in which patterns are repeated three times in time domain, the system having an auto-correlator for calculating an auto-correlation value of a received signal and a signal delayed by a predetermined time, a power detector for calculating a power of the received signal, a timing metric/normalizer for normalizing the auto-correlation value by dividing the auto-correlation value by the calculated power to obtain a timing metric, and a peak detector for finding a peak value of the timing metric to estimate a frame starting position and an initial symbol timing. The synchronization method includes: calculating an auto-correlation length using $(2N_p-1)+N_{cp}$ ($N_p$: $N_{FFT}/3$, $N_{cp}$: length of a guard interval), considering the preamble characteristic that the patterns are repeated in the time domain; and setting the initial symbol timing to a position determined by adding the position where the timing metric has a peak value to the length of the guard interval and subtracting the maximum value of the expected channel delay spread from the result value.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
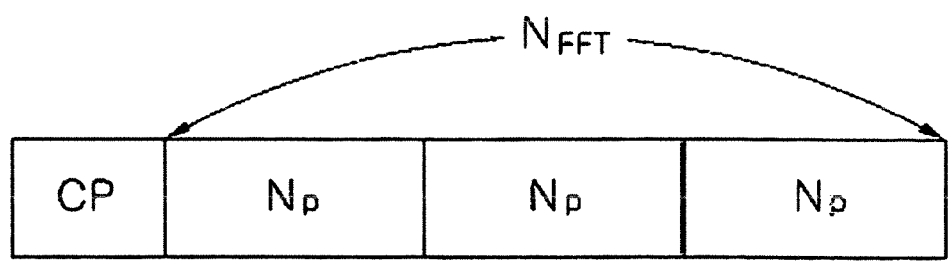
FIG. 1 illustrates a preamble structure of a conventional 802.16a/d/e system and WiBro system in a time domain.
Figure 2:
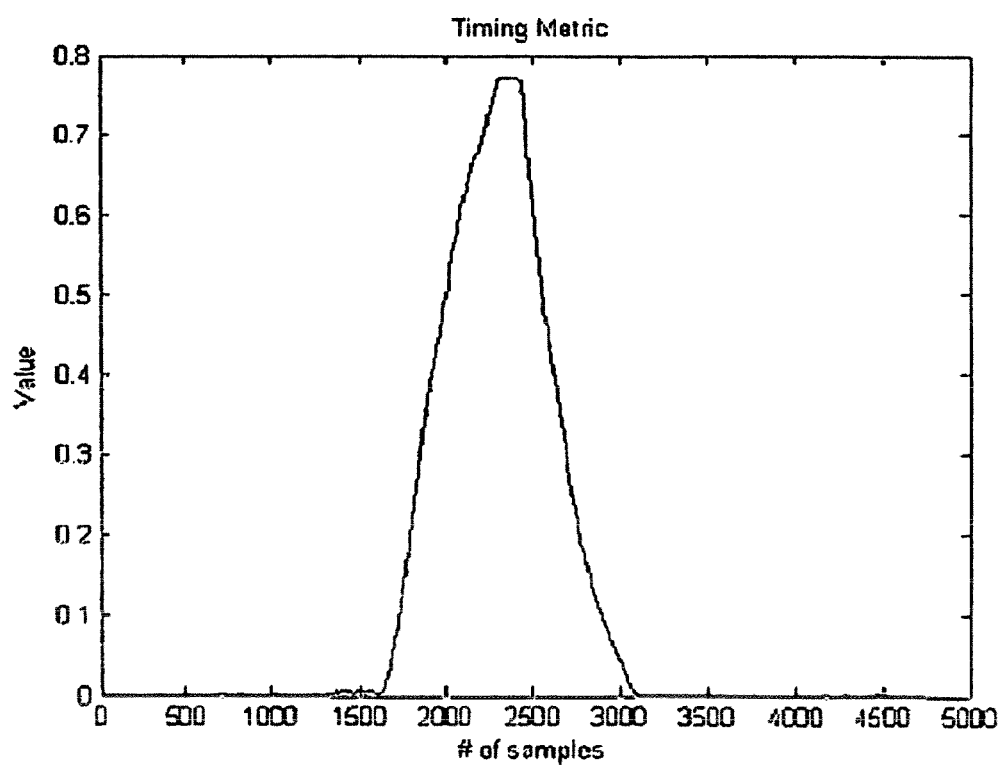
FIG. 2 is a graph illustrating a timing metric of a conventional symbol timing estimation algorithm.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, preferred embodiments of the present invention will be described in detail with reference to the accompanying drawings.

Figure 4:
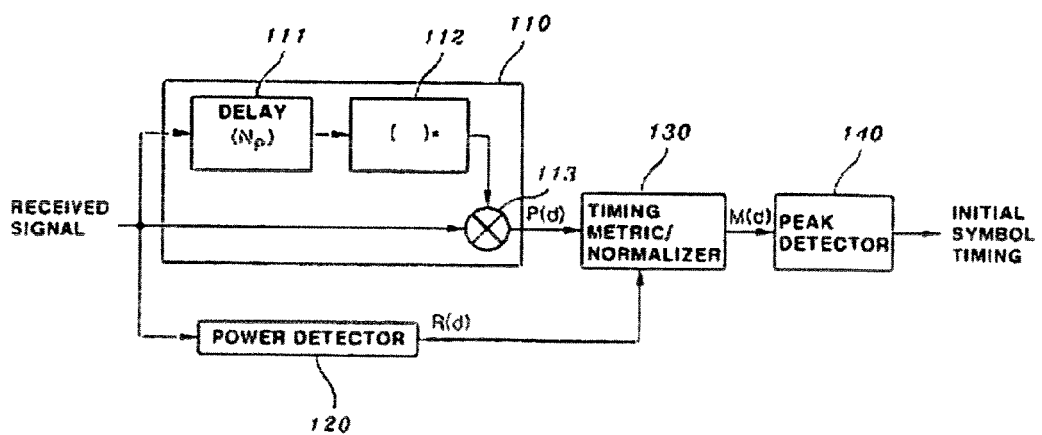
FIG. 4 is a block diagram of a synchronization apparatus for improving timing estimation performance according to the present invention.

FIG. 4 is a block diagram of a synchronization apparatus for improving timing estimation performance in an OFDM-FDMA/CDMA/TDMA system according to the present invention. A first symbol of each frame in a received OFDM signal includes a preamble in which patterns are repeated three times in time domain. A position of an initial symbol timing is estimated by an auto correlation using the preamble structure.

Referring to FIG. 4, the synchronization apparatus includes an auto-correlator 110, a power detector 120, a timing metric/normalizer 130, and a peak detector 140.

The auto-correlator 110 calculates an auto-correlation value P(d) of a received signal and a signal delayed by Np (Np=$N_{FFT}/3$ where $N_{FFT}$ is an FFT size).

The power detector 120 calculates a power R(d) of the received signal in order to normalize the auto-correlation value P(d). The timing metric/normalizer 130 normalizes the auto-correlation value P(d) by dividing it by the power R(d) of the received signal and thus obtains a timing metric M(d).

The peak detector 140 detects a peak value of the timing metric by measuring one frame while moving one sample from an arbitrary starting point and estimates the frame starting point and the initial symbol timing.

In the auto-correlator 110, a delay unit 111 delays the received signal by $N_p$, and a complex unit 112 generates conjugation samples of the delayed signals, and a multiplier 113 outputs the auto-correlation value P(d) by multiplying the received signal and an output signal of the complex unit 112.

The process of estimating the initial symbol timing will be described below.

Assuming that the FFT size is $N_{FFT}$, $N_p$ is $N_{FFT}/3$, and $N_{cp}$ is a length of the guard interval, the auto-correlation value P(d) of a sample having a length of $(2N_p+N_{cp})$ of the preamble symbol and a sample having a $N_p$-delayed length of $((2N_p-1)+N_{cp})$ is expressed as Equation (1) below.

$$P(d) = \sum_{m=0}^{(2N_p-1)+N_{cp}} r(d+m)r^*(d+m+N_p) \quad (1)$$

where r(d) denotes the received signal, d denotes a sample index of the received signal, and m denotes a correlation length index $(0-(2N_p-1)+N_{cp})$.

The power detector 120 calculates the power of the received signal in order to normalize the auto-correlation value P(d) by using Equation (2) below.

$$R(d) = \sum_{m=0}^{(2N_p-1)+N_{cp}} |r(d+m)|^2 \quad (2)$$

The timing metric/normalizer 130 normalizes the calculated auto-correlation value P(d) by dividing it by the power R(d) of the received signal to obtain the timing metric M(d). This process is expressed as Equation (3) below.

$$M(d) = \frac{|P(d)|^2}{(R(d))^2} \quad (3)$$

In the ideal case in which there is no influence of channel or interference signal, the frame starting position and the initial symbol timing are acquired at the symbol starting point. Thus, the FFT window position corresponds to a position determined by adding the length of the guard interval to the acquired position.

However, due to the influence of channel delay spread or interference signal, there is a great probability that the timing metric will be acquired later than the ideal case.

Therefore, the initial symbol timing is set at a position determined by adding the length of the guard interval to the position where the timing metric has a peak value and subtracting the maximum value of the expected channel delay spread from the result value.

Like the conventional algorithm, the symbol timing estimation algorithm according to the present invention sets a threshold value ($\lambda_f$) and determines the value of the timing metric as the symbol timing value only when the peak value of the estimated timing metric exceeds the threshold value ($\lambda_f$). The threshold value ($\lambda_f$) is set in the peak detector 140.

Figure 5:
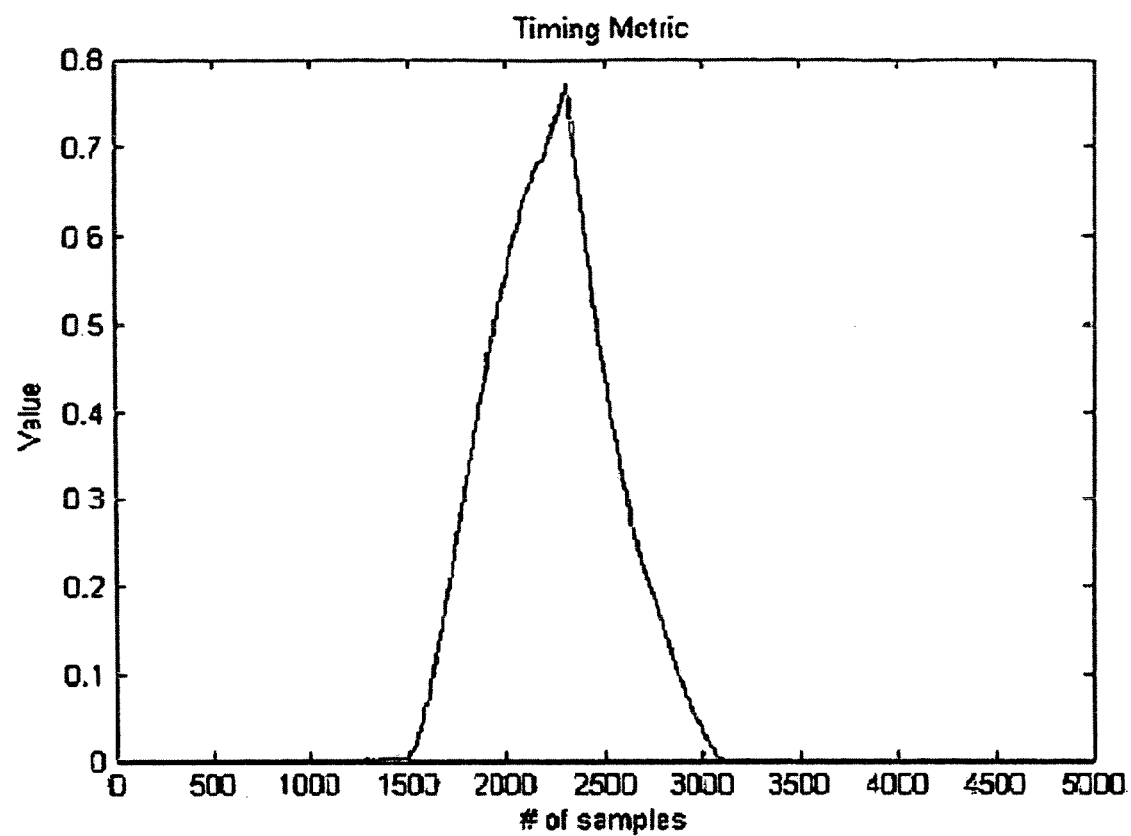
FIG. 5 is a graph illustrating a timing metric of a symbol timing estimation algorithm according to the present invention.

FIG. 5 is a graph illustrating the timing metric of the symbol timing estimation algorithm according to the present invention.

Figure 3:
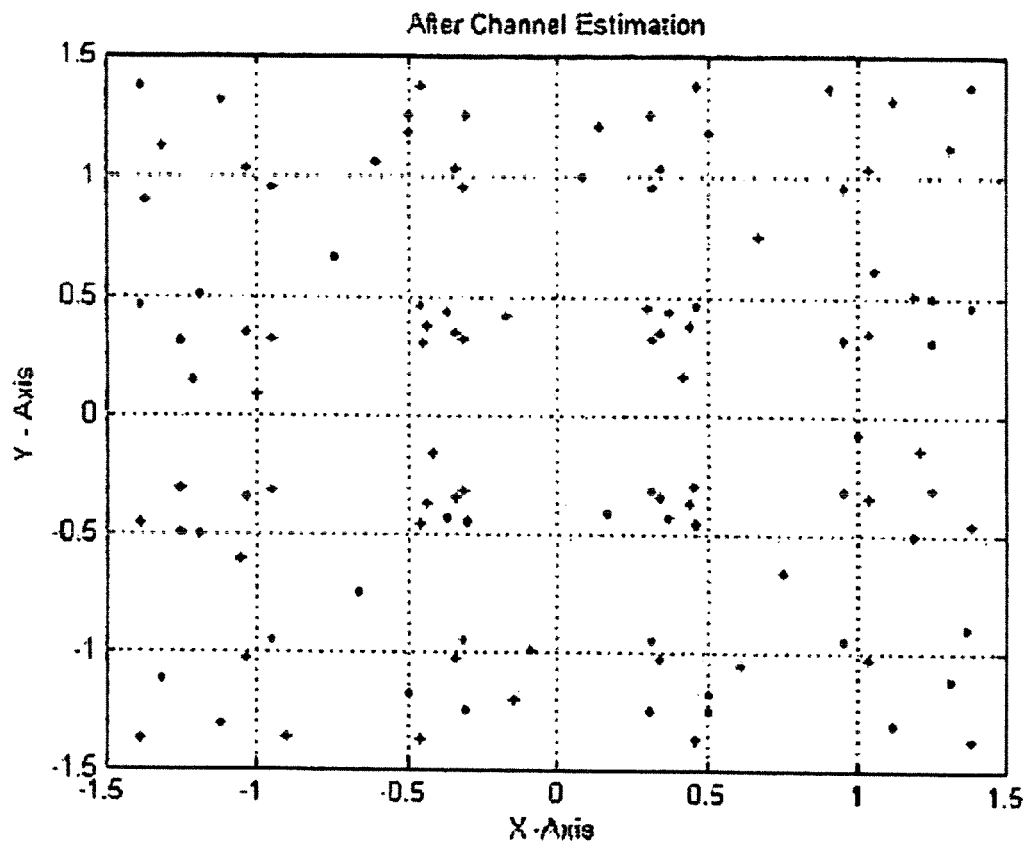
FIG. 3 illustrates a constellation diagram of a traffic channel using the conventional symbol timing estimation algorithm.

While the conventional timing metric of FIG. 3 has the flat characteristic as much as the length of the guard interval, the timing metric of FIG. 5 has a pointed shape because it has a peak value at the starting point of the guard interval.

Therefore, compared with the related art, the symbol timing estimation algorithm according to the present invention can acquire the timing at a more correct position.

Figure 6:
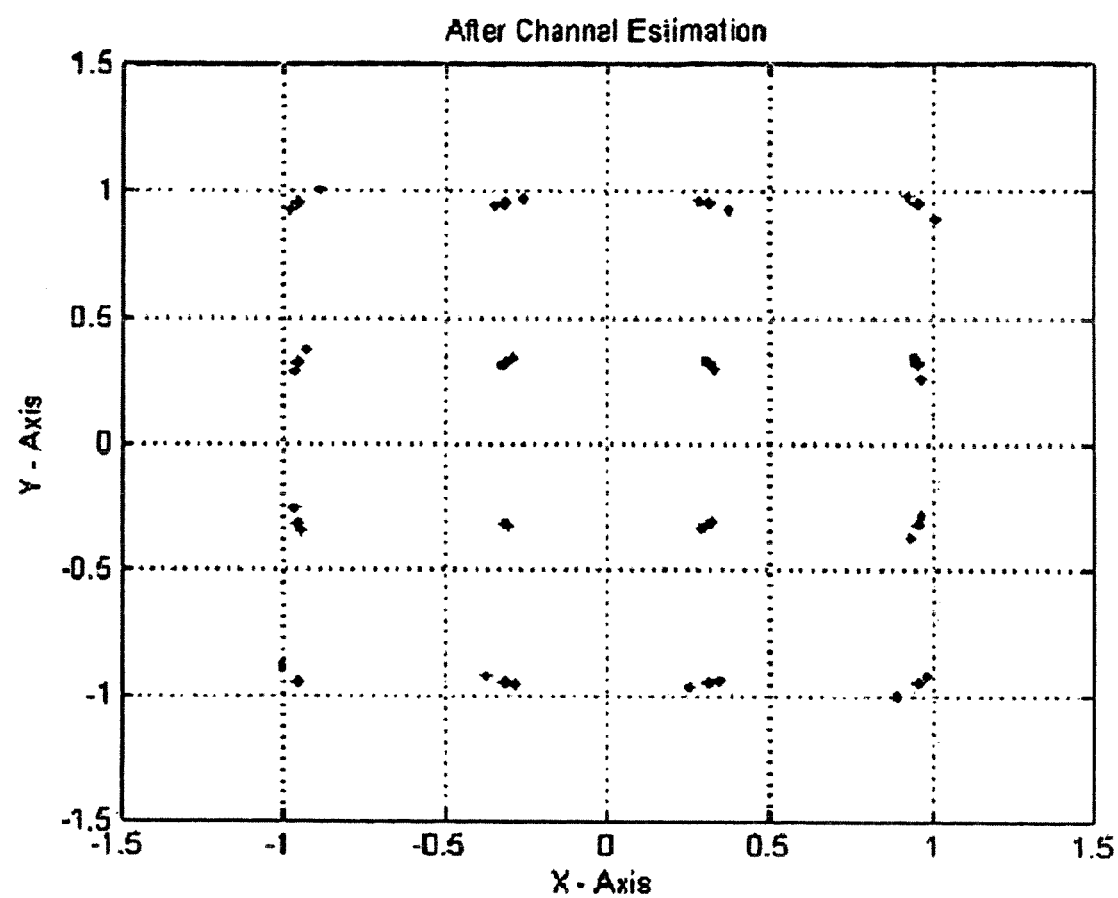
FIG. 6 illustrates a constellation diagram of a traffic channel using the symbol timing estimation algorithm according to the present invention.

FIG. 6 illustrates a constellation diagram of the traffic channel using the symbol timing estimation algorithm according to the present invention. It can be seen from FIG. 6 that the traffic channel has a more correct constellation diagram compared with that of FIG. 4.

In addition, it can be seen that the degradation in the SNR of the received signal due to the synchronization error is reduced.

Figure 7:
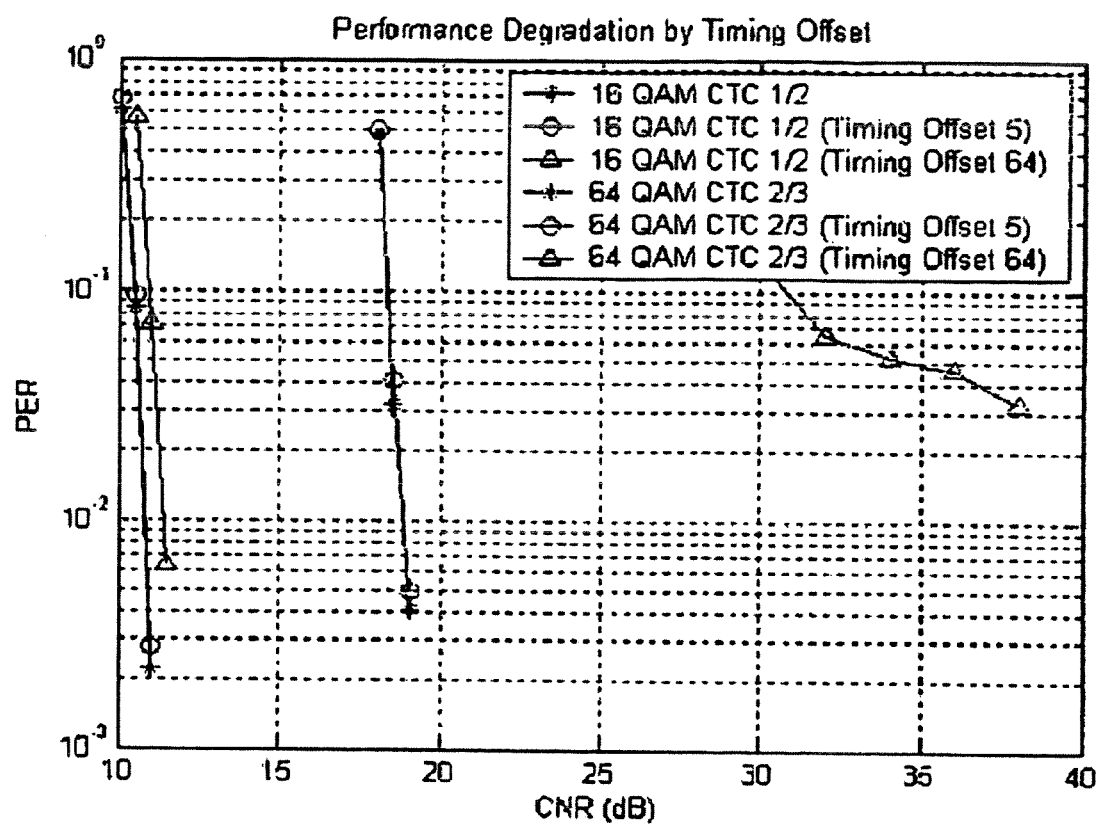
FIG. 7 is a graph illustrating the performance of the traffic channel according to timing offset.

FIG. 7 is a graph illustrating the performance of the traffic channel according to timing offset. Specifically, FIG. 7 shows how much the performance is degraded when the timing offsets of 5 and 64 are applied in the case where the traffic channel is 16 QAM convolutional turbo code (CTC) 1/2 and 64 QAM CTC 2/3.

ITU-R Vehicular A 60 km/h was used as the radio channel.

When the timing offsets of the 16 QAM and the 64 QAM are 5, their performance is similar to that of the ideal case. However, when the timing offsets are 64, the 16 QAM exhibits the performance degradation of about 0.5 dB at target PER $10^{-2}$.

However, the 64 QAM cannot obtain a desired performance because error flow occurs. The 64 QAM is sensitive to the phase rotation characteristic because its Euclidian distance is shorter than that of the 16 QAM.

Assuming that the conventional timing estimation algorithm does not perform a fine timing synchronization (FTS) process, the 16 QAM can be used, but the 64 QAM cannot be used.

On the other hand, the symbol timing estimation algorithm according to the present invention can provide excellent performance without additional FTS process.

As described above, in estimating the symbol timing of the downlink preamble in the OFDM-FDMA/CDMA/TDMA-based system, the timing metric that generates the peak at the correct symbol timing position can be obtained using the preamble structure in which patterns are repeated three times in time domain after the IFFT process. Therefore, the correct timing position can be obtained by removing the ambiguity of the conventional symbol timing estimation algorithm, thereby preventing the degradation in the performance of the traffic channel due to the synchronization error.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A synchronization apparatus for symbol timing synchronization of an OFDM-FDMA/CDMA/TDMA system having a preamble structure in which patterns are repeated three times in time domain, the synchronization apparatus comprising:

an auto-correlator for calculating an auto-correlation value of a received signal and a signal delayed by $N_p(N_p=N_{FFT}/3$ where $N_{FFT}$ is an FFT size);

a power detector for calculating power of the received signal in order to normalize the auto-correlation value;

a timing metric/normalizer for normalizing the auto-correlation value by dividing the auto-correlation value by the calculated power to obtain a timing metric; and a peak detector for finding a peak value of the timing metric by measuring one frame while moving by one sample from an arbitrary staffing point and estimating a frame starting position and an initial symbol timing, wherein the auto-correlator calculates the auto-correlation value by applying $(2N_p-1)+N_{cp}$ as correlation length, where $N_{cp}$ is a length of a guard interval.

2. The synchronization apparatus according to claim 1, wherein the auto-correlator calculates the auto-correlation value using a following equation $$P(d) = \sum_{m=0}^{(2N_p-1)+N_{cp}} r(d+m)r^*(d+m+N_p)$$

where r(d) denotes the received signal, d denotes a sample index of the received signal, and m denotes a correlation length index.

3. The synchronization apparatus according to claim 1, wherein the initial symbol timing is set to a position determined by adding the length of the guard interval to a position where the timing metric has a peak value and subtracting the maximum value of an expected channel delay spread from the position added by the length of the guard interval to the position where the timing metric has a peak value.

4. The synchronization apparatus according to claim 3, wherein the symbol timing value is set only when the peak value of the timing metric exceeds the threshold value.

5. A synchronization method for symbol timing synchronization of an OFDM-FDMA/CDMA/TDMA system having a preamble structure in which patterns are repeated three times in time domain, the system having an auto-correlator for calculating an auto-correlation value of a received signal and a signal delayed by a predetermined time, a power detector for calculating power of the received signal, a timing metric/normalizer for normalizing the auto-correlation value by dividing the auto-correlation value by the calculated power to obtain a timing metric, and a peak detector for finding a peak value of the timing metric to estimate a frame staffing position and an initial symbol timing, the synchronization method comprising:

calculating the auto-correlation value by applying $(2N_p-1)+N_{cp}$ as correlation length, where $N_{cp}$ is a length of a guard interval; and setting the initial symbol timing to a position determined by adding the length of the guard interval to a position where the timing metric has a peak value and subtracting the maximum value of an expected channel delay spread from the position added by the length of the guard interval to the position where the timing metric has a peak value.

6. The synchronization method according to claim 5, wherein the auto-correlation value is calculated using a following equation $$P(d) = \sum_{m=0}^{(2N_p-1)+N_{cp}} r(d+m)r^*(d+m+N_p)$$

where r(d) denotes the received signal, d denotes a sample index of the received signal, and m denotes a correlation length index.

* * * * *